United States Patent
Nakamura et al.

(10) Patent No.: US 10,626,931 B2
(45) Date of Patent: Apr. 21, 2020

(54) ELECTROMAGNETIC CLUTCH MECHANISM

(71) Applicant: DENSO CORPORATION, Kariya, Aichi-pref. (JP)

(72) Inventors: Yosuke Nakamura, Kariya (JP); Toshihiro Konishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/080,372

(22) PCT Filed: Mar. 27, 2017

(86) PCT No.: PCT/JP2017/012445
§ 371 (c)(1),
(2) Date: Aug. 28, 2018

(87) PCT Pub. No.: WO2017/170431
PCT Pub. Date: Oct. 5, 2017

(65) Prior Publication Data
US 2019/0072136 A1 Mar. 7, 2019

(30) Foreign Application Priority Data
Mar. 28, 2016 (JP) ................. 2016-064555

(51) Int. Cl.
*F16D 27/14* (2006.01)
*F16D 27/112* (2006.01)

(52) U.S. Cl.
CPC ............ *F16D 27/112* (2013.01); *F16D 27/14* (2013.01); *F16D 2500/1022* (2013.01)

(58) Field of Classification Search
CPC .................. F16D 27/112; F16D 27/14; F16D 2500/1022; F16D 27/10
See application file for complete search history.

(56) References Cited

U.S. PATENT DOCUMENTS 5,009,297 A * 4/1991 Gonda ................. F16D 27/112
192/30 V
5,445,256 A * 8/1995 Tabuchi ................ F16D 27/112
192/200
(Continued)

FOREIGN PATENT DOCUMENTS

JP S62-167936 U1 10/1987
JP H06-346927 A 12/1994
(Continued)

*Primary Examiner* — David J Hlavka
(74) *Attorney, Agent, or Firm* — Posz Law Group, PLC

(57) ABSTRACT

An electromagnetic clutch mechanism includes: a driving-side rotatable body; a driven-side rotatable body; an electromagnet; a flat spring; and an elastic member that alleviates a collision impact generated between the driven-side rotatable body and the driving-side rotatable body. The driven-side rotatable body includes a recess recessed in an A direction, which is opposite to a direction that is directed from the driven-side rotatable body toward the elastic member in an axial direction. The recess functions as an urging portion that exerts an urging force to the elastic member through contact of the recess against the elastic member at the time of energizing the electromagnet. The elastic member includes an urging-force receiving portion, and the urging-force receiving portion receives the urging force from the recess through contact of the urging-force receiving portion to the recess at the time of energizing the electromagnet.

6 Claims, 6 Drawing Sheets

(56) References Cited

U.S. PATENT DOCUMENTS

| | | | | |
|---|---|---|---|---|
| 5,551,546 | A | * | 9/1996 | Tabayama ............. F16D 27/112 192/84.96 |
| 5,560,464 | A | * | 10/1996 | Gonda .................. F16D 27/112 192/30 V |
| 5,575,370 | A | * | 11/1996 | Gonda .................. F16D 27/112 192/30 V |
| 5,667,050 | A | * | 9/1997 | Hasegawa ............. F16D 27/112 192/84.961 |
| 6,286,650 | B1 | * | 9/2001 | Tabuchi ................ F16D 27/112 192/84.94 |
| 8,757,343 | B2 | * | 6/2014 | Sakuraba .............. F16D 27/112 192/200 |
| 2003/0159901 | A1 | * | 8/2003 | Hayashi ................ F16D 27/112 192/84.941 |
| 2005/0183923 | A1 | | 8/2005 | Konishi et al. |
| 2016/0053828 | A1 | * | 2/2016 | Ookuma ............... F16D 27/112 192/84.31 |

FOREIGN PATENT DOCUMENTS

| | | |
|---|---|---|
| JP | H08-121503 A | 5/1996 |
| JP | 2006-177502 A | 7/2006 |
| JP | 2007-009948 A | 1/2007 |

\* cited by examiner

ELECTROMAGNETIC CLUTCH MECHANISM

CROSS REFERENCE TO RELATED APPLICATIONS

This application is the U.S. national phase of International Application No. PCT/JP2017/012445 filed on Mar. 27, 2017 and is based on and incorporates herein by reference Japanese Patent Application No. 2016-64555 filed on Mar. 28, 2016.

TECHNICAL FIELD

The present disclosure relates to an electromagnetic clutch mechanism that enables and disables transmission of a rotational drive force.

BACKGROUND

Previously, as this kind of electromagnetic clutch mechanism, a so-called flat-spring-hub-type electromagnetic clutch mechanism, which uses flat springs to enable and disable transmission of a rotational drive force from a pulley (serving as a driving-side rotatable body) to an armature (serving as a driven-side rotatable body), is disclosed in, for example, the patent literature 1.

In the flat-spring-hub-type electromagnetic clutch mechanism, when an electromagnet is energized, the armature is attracted to the pulley and is coupled to the pulley to transmit the rotational drive force from the pulley to the armature. In contrast, when the electromagnet is deenergized, the armature is displaced away from the pulley by a resilient force, i.e., a reaction force of the respective flat springs, and thereby the transmission of the rotational drive force is disabled.

More specifically, the armature and an inner hub are coupled with each other through the flat springs, and the armature is displaced by the resilient force, i.e., the reaction force of the respective flat springs in a direction away from the pulley.

Lately, because of an increased need for reducing NV, i.e., an increased need for reducing the noise and vibration and an increased need for the low costs, it is very promising to reduce the operational sound of the flat-spring-hub-type electromagnetic clutch mechanism that has the simple structure.

For example, in the prior art technique disclosed in the patent literature 1, a rubber member is placed between the armature and each flat spring such that the operational sound is reduced by alleviating the vibrations of the armature generated at the time of colliding the armature against the pulley upon attracting of the armature toward the pulley. Specifically, the rubber member is placed between a surface of the armature, which is shaped in a form of a generally planar surface, and a surface of the flat spring, which is shaped in a form of a generally planar surface.

Furthermore, previously, a so-called rubber-hub-type electromagnetic clutch mechanism is disclosed in, for example, the patent literature 2. The rubber-hub-type electromagnetic clutch mechanism implements the reaction force, which separates the armature from the pulley, through use of a rubber member instead of the flat springs.

According to the prior art technique disclosed in the patent literature 2, a hub plate is joined to the armature, and the hub plate and the inner hub are connected together through the rubber member, which is shaped into a ring form. The armature and the hub plate are displaced away from the pulley by an elastic force, i.e., a reaction force of the rubber member.

Furthermore, the patent literature 2 recites that a projection, which is molded integrally with a radially outer part of the rubber member, is clamped between the hub plate and the armature to reduce the operational sound.

CITATION LIST

Patent Literature

PATENT LITERATURE 1: JPH08-121503A
PATENT LITERATURE 2: JPS62-167936U

SUMMARY

As discussed above, in the electromagnetic clutch mechanism of the patent literature 1, the rubber member is placed between the armature and the flat springs, and the operational sound is reduced by alleviating the vibrations of the armature through the rubber member at the time of colliding the armature against the pulley upon attracting of the armature toward the pulley.

Here, in this electromagnetic clutch mechanism, in order to sufficiently alleviate the vibrations of the armature, it is desirable to increase the urging force between the rubber member and the armature by increasing a thickness of the rubber member. Specifically, the thickness of the rubber member is a thickness of the rubber member measured in an axial direction of a rotational axis of the pulley. Here, when the thickness of the rubber member is increased, an overall size of the electromagnetic clutch mechanism is disadvantageously increased in the axial direction of the rotational axis of the pulley.

However, in the electromagnetic clutch mechanism of the patent literature 1, the rubber member is placed between the surface of the armature, which is shaped in the form of the generally planar surface, and the surface of each flat spring, which is shaped in the form of the generally planar surface. Therefore, a length of the armature, a length of the rubber member and a length of each flat spring measured in the axial direction of the rotational axis contribute the length of the electromagnetic clutch mechanism measured in the axial direction of the rotational axis. Thereby, the overall size of the electromagnetic clutch mechanism is disadvantageously increased. Specifically, in this electromagnetic clutch mechanism, it is not possible to achieve both of: the sufficient alleviation of the vibrations of the armature through increasing of the thickness of the rubber member; and the limit of the increase in the size of the electromagnetic clutch mechanism.

On the other hand, the prior art technique of the patent literature 2 relates to the rubber-hub-type electromagnetic clutch mechanism that differs from the flat-spring-hub-type electromagnetic clutch mechanism with respect to the basic structure. Therefore, the prior art technique of the patent literature 2 cannot be simply applied to the flat-spring-hub-type electromagnetic clutch mechanism.

It is an objective of the present disclosure to provide an electromagnetic clutch mechanism that can sufficiently alleviate vibrations of an armature while limiting an increase in a size of the electromagnetic clutch mechanism.

According to one aspect of the present disclosure, the electromagnetic clutch mechanism is constructed as follows. Specifically, the electromagnetic clutch mechanism includes a driving-side rotatable body that is rotated by a rotational drive force received from a drive source. Furthermore, the electromagnetic clutch mechanism includes a driven-side rotatable body that receives the rotational drive force when the driven-side rotatable body is coupled to the driving-side rotatable body in an axial direction of a rotational axis of the driving-side rotatable body. Furthermore, the electromagnetic clutch mechanism includes an electromagnet that generates a magnetic force, which attracts the driven-side rotatable body in the axial direction of the rotational axis, at a time of energizing the electromagnet. Furthermore, the electromagnetic clutch mechanism includes a flat spring that generates a resilient force, which urges the driven-side rotatable body in a direction that is axially opposite from a direction of attracting the driven-side rotatable body by the electromagnet in the axial direction of the rotational axis. Furthermore, the electromagnetic clutch mechanism includes an elastic member that alleviates a collision impact, which is generated at a time of colliding the driven-side rotatable body against the driving-side rotatable body. Furthermore, the driven-side rotatable body includes a recess, and the recess is recessed in an A direction and functions as an urging portion that exerts an urging force to the elastic member through contact of the recess against the elastic member at the time of energizing the electromagnet. The A direction is a direction, which is opposite to a direction that is directed from the driven-side rotatable body toward the elastic member in the axial direction of the rotational axis. The elastic member includes an urging-force receiving portion, and the urging-force receiving portion receives the urging force from the recess through contact of the urging-force receiving portion to the recess at the time of energizing the electromagnet.

Accordingly, the collision impact, which is generated between the driving-side rotatable body and the driven-side rotatable body, can be alleviated by an elastic force of the urging-force receiving portion of the elastic member at the time of energizing the electromagnet. Furthermore, since the urging-force receiving portion of the elastic member is a portion that contacts the recess of the driven-side rotatable body, it is possible to limit an increase in the size of the electromagnetic clutch mechanism, which would be otherwise caused by a thickness of the urging-force receiving portion of the elastic member measured in the axial direction of the rotational axis, by an amount that corresponds to a depth of the recess. Therefore, the thickness of the elastic member measured in the axial direction of the rotational axis can be increased while limiting the increase in the size of the electromagnetic clutch mechanism, and thereby the vibrations of the driven-side rotatable body can be sufficiently alleviated.

DESCRIPTION OF EMBODIMENTS

Hereinafter, embodiments of the present disclosure will be described with reference to the drawings. In the following embodiments, the same or equivalent parts are denoted by the same reference signs.

First Embodiment

Figure 1:
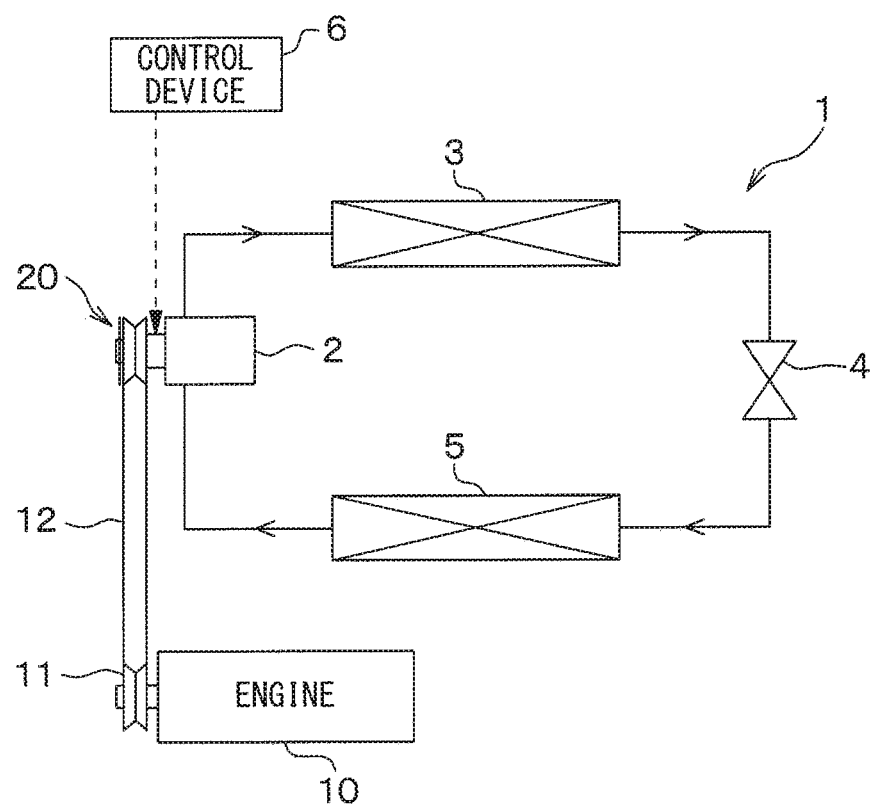
FIG. 1 is a diagram showing an overall structure of a refrigeration cycle system, in which an electromagnetic clutch mechanism of a first embodiment is applied.

An electromagnetic clutch mechanism 20 of a first embodiment and a refrigeration cycle system 1 of a vehicle air conditioning apparatus, in which the electromagnetic clutch mechanism 20 is applied, will be described with reference to FIGS. 1 to 5. As shown in FIG. 1, the refrigeration cycle system 1 includes: a refrigerant circuit, in which a compressor 2, a radiator 3, an expansion valve 4 and an evaporator 5 are connected in series; and the electromagnetic clutch mechanism 20.

Figure 2:
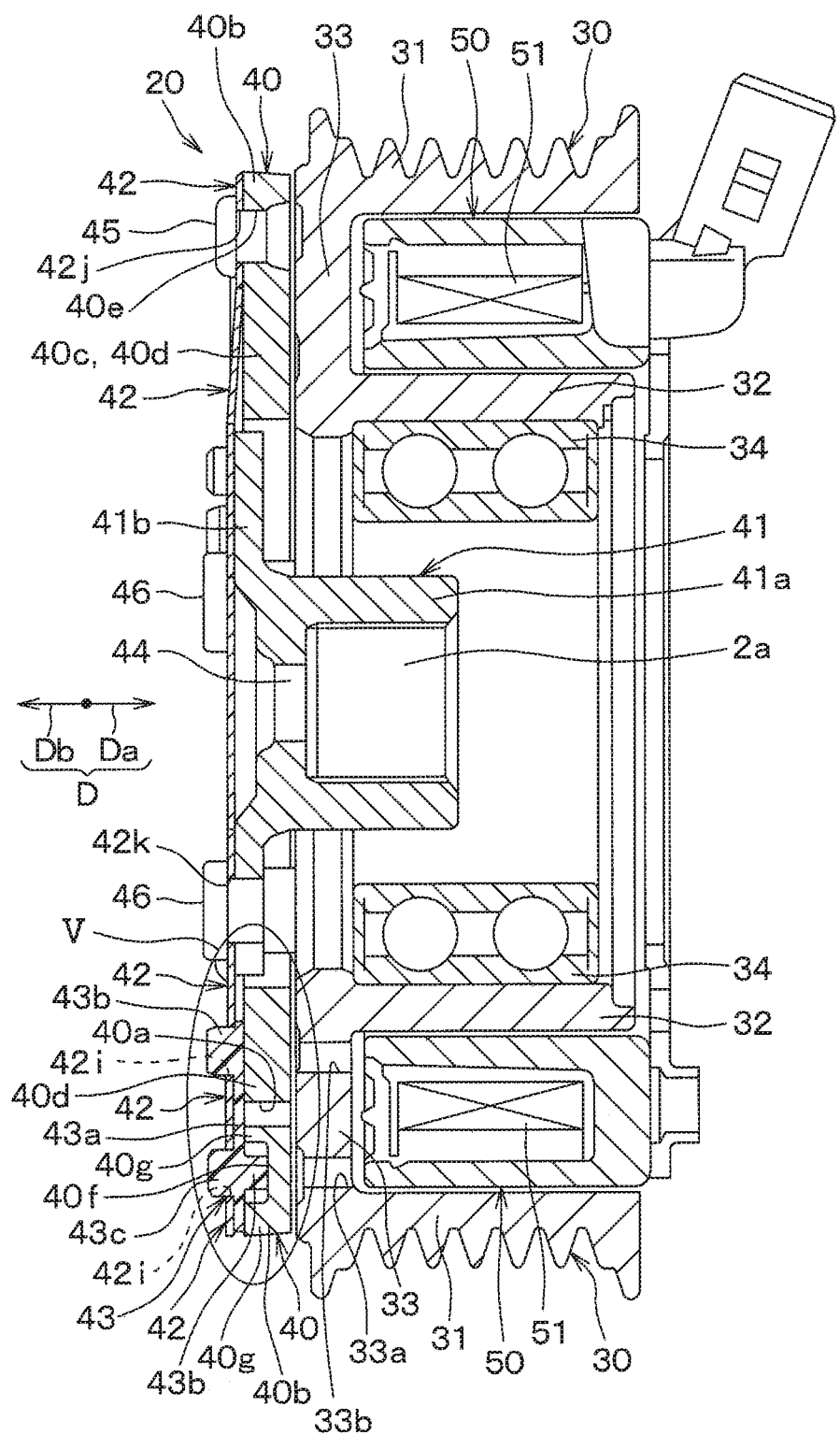
FIG. 2 is a diagram showing an axial partial cross-section of the electromagnetic clutch mechanism of FIG. 1 at a time of decoupling between a pulley and an armature.

The compressor 2 is configured to suction and compress refrigerant. The compressor 2 rotates a compression mechanism thereof to suction and compress the refrigerant upon receiving a rotational drive force from an engine 10 that is a drive source, which outputs a drive force for driving a vehicle. As shown in FIG. 2, the compressor 2 includes a rotatable shaft 2a that is rotated by the rotational drive force received from the engine 10. The compression mechanism of the compressor 2 is driven when rotation of a pulley 30, which is rotated by the rotational drive force received from the engine 10, is transmitted to the rotatable shaft 2a of the compressor 2 through an armature 40 described later.

In the present embodiment, the armature 40 and the pulley 30 are rotated about a rotational axis of the rotatable shaft 2a of the compressor 2. Specifically, in the present embodiment, the rotational axis of the compressor 2, the rotational axis of the armature 40 and the rotational axis of the pulley 30 are coaxial to each other. Therefore, these rotational axes will be simply referred to the rotational axis unless otherwise specified.

The radiator 3 is configured to release heat from the refrigerant, which is discharged from the compressor 2, through heat exchange between the refrigerant and the air.

The expansion valve 4 depressurizes and expands the refrigerant that is supplied from the radiator 3.

The evaporator 5 evaporates the refrigerant, which is depressurized through the expansion valve 4, to exert a heat absorbing action.

Figure 3:
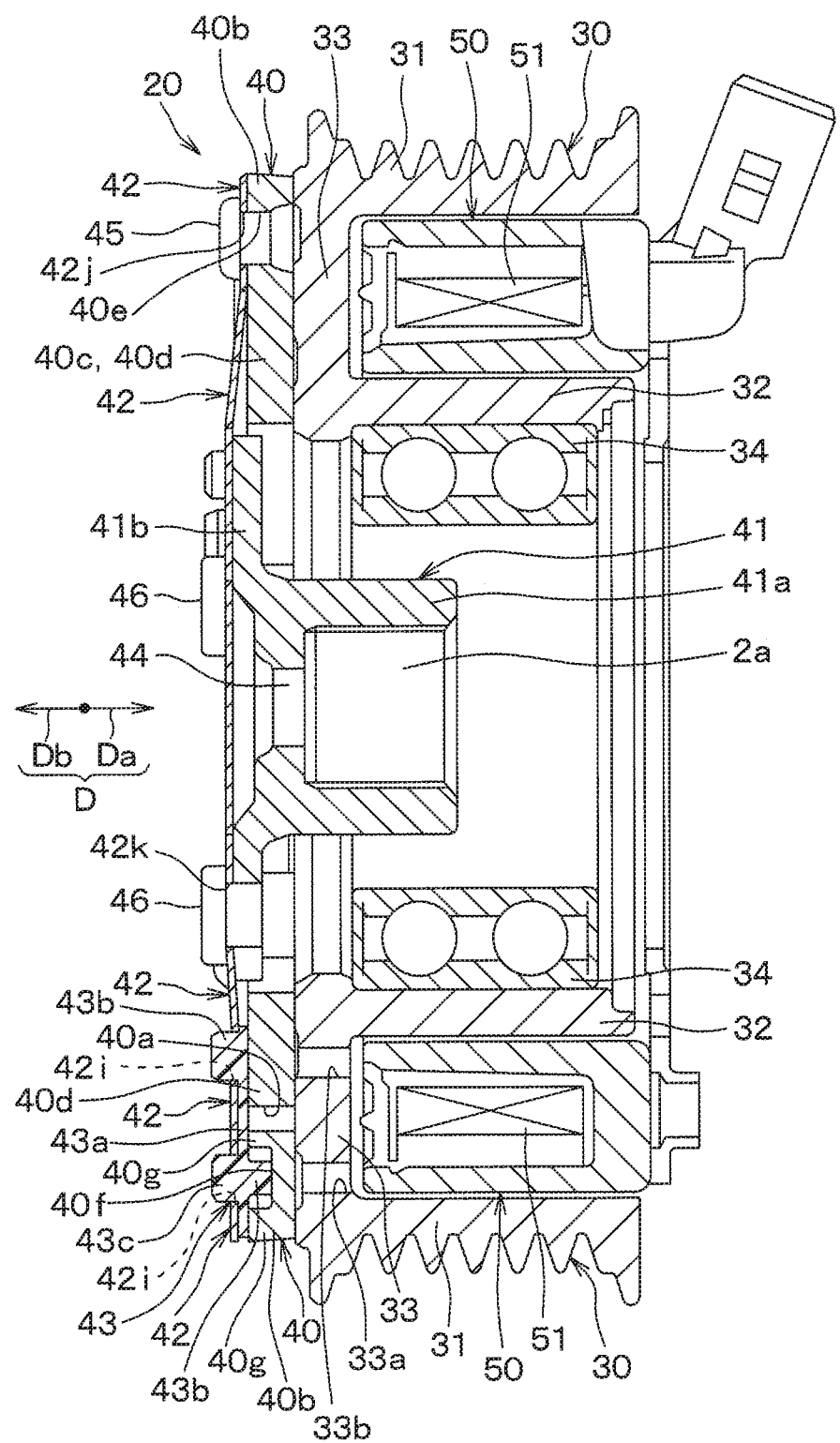
FIG. 3 is a diagram showing an axial partial cross-section of the electromagnetic clutch mechanism of FIG. 1 at a time of coupling between the pulley and the armature.

The electromagnetic clutch mechanism 20 is a mechanism that enables and disables transmission of the rotational drive force from the engine 10 to the compressor 2. As shown in FIGS. 2 and 3, the electromagnetic clutch mechanism 20 includes the pulley 30, a ball bearing 34, the armature 40, an inner hub 41, a flat spring 42, a plurality of elastic members 43, a plurality of rivets 45, a plurality of rivets 46 and a stator 50.

The pulley 30 is a driving-side rotatable body that is rotated by the rotational drive force received from the engine 10. As shown in FIG. 3, the pulley 30 includes an outer cylindrical tubular portion 31, an inner cylindrical tubular portion 32 and an end surface portion 33 and is formed integrally in one piece from a magnetic material (e.g., iron). In the present embodiment, when the armature 40 is coupled to the pulley 30 in an axial direction of the rotational axis of the pulley 30, the rotational drive force of the engine 10 is transmitted to the armature 40.

In the present embodiment, when the electromagnetic clutch mechanism 20 couples between the pulley 30 and the armature 40, the rotational drive force of the engine 10 is transmitted to the compressor 2. In contrast, when the electromagnetic clutch mechanism 20 decouples between the pulley 30 and the armature 40, the rotational drive force of the engine 10 is not transmitted to the compressor 2. In the present embodiment, when the electromagnetic clutch mechanism 20 transmits the rotational drive force of the engine 10 to the compressor 2, the refrigeration cycle system 1 is operated. Furthermore, when the electromagnetic clutch mechanism 20 does not transmit the rotational drive force of the engine 10 to the compressor 2, the refrigeration cycle system 1 is not operated and is thereby stopped. In the present embodiment, the operation of the electromagnetic clutch mechanism 20 is controlled by a control signal outputted from an air conditioning control device 6 that controls the operation of each corresponding one of the constituent devices of the refrigeration cycle system 1.

The outer cylindrical tubular portion 31 and the inner cylindrical tubular portion 32 are respectively configured into a cylindrical tubular form, and the inner cylindrical tubular portion 32 is placed on a radially inner side of the outer cylindrical tubular portion 31. The outer cylindrical tubular portion 31 and the inner cylindrical tubular portion 32 are coaxial with the rotatable shaft 2a of the compressor 2. Hereinafter, unless otherwise specified, a direction, which is parallel to the rotatable shaft 2a, will be simply referred to as an axial direction of the rotational axis, and a radial direction of the rotatable shaft 2a will be simply referred to as the radial direction. Additionally, a circumferential direction of the rotatable shaft 2a will be simply referred to as a circumferential direction. The direction, which is parallel to the rotatable shaft 2a, is a left-to-right direction in FIGS. 2 and 3. The radial direction of the rotatable shaft 2a is a direction that is perpendicular to the rotatable shaft 2a. The end surface portion 33 is formed into a ring plate form and radially connects between one end part of the outer cylindrical tubular portion 31 and one end part of the inner cylindrical tubular portion 32 located on one end side in the axial direction of the rotational axis, i.e., radially connects between the left end part of the outer cylindrical tubular portion 31 and the left end part of the inner cylindrical tubular portion 32 shown in FIGS. 2 and 3. The end surface portion 33 functions as a friction surface that contacts the armature 40 when the pulley 30 and the armature 40 are coupled together. A friction member (not shown) is embedded in a surface of the end surface portion 33, which contacts the armature 40. The friction member is a member that increases a friction coefficient of the friction surface and is made of a non-magnetic material. Specifically, for example, the friction member may be made of a material, which is formed by mixing alumina into resin and solidifying the resin. Alternatively, the friction member may be made of a sintered material, which is formed by sintering metal powder (e.g., aluminum powder).

The outer cylindrical tubular portion 31, the inner cylindrical tubular portion 32 and the end surface portion 33 form a part of a magnetic circuit, through which a magnetic flux generated from an electromagnet 51 flows. In the present embodiment, a poly-V groove, around which a V-belt 12 is wound, is formed at an outer peripheral surface of the outer cylindrical tubular portion 31. The ball bearing 34 is fixed to an inner peripheral surface of the inner cylindrical tubular portion 32. The ball bearing 34 fixes the pulley 30 in a rotatable manner relative to a housing (not shown) that forms an outer shell of the compressor 2. Therefore, an outer race of the ball bearing 34 is fixed to the inner peripheral surface of the inner cylindrical tubular portion 32, and an inner race of the ball bearing 34 is fixed to a housing boss (not shown) that is formed at the housing of the compressor 2. The housing boss is shaped into a cylindrical tubular form that is coaxial with the rotatable shaft 2a of the compressor 2. In the present embodiment, the end surface portion 33 includes a plurality of slit holes 33a, 33b, which penetrate through a front side to a back side of the end surface portion 33, and the slit holes 33a, 33b are respectively shaped into an arcuate form that has a center of the arc placed at the axis of the rotatable shaft 2a. In a view taken in the axial direction, the slit holes 33a and the slit holes 33b are placed in two rows, respectively, in the radial direction while the slit holes 33a are arranged one after another in the circumferential direction, and the slit holes 33b are arranged one after another in the circumferential direction.

The armature 40 is a driven-side rotatable body that is coupled to the rotatable shaft 2a of the compressor 2. The armature 40 is a ring plate member that is coaxial with the rotatable shaft 2a and is formed in one piece from a magnetic material (e.g., iron). The armature 40 forms a part of the magnetic circuit, in which the magnetic flux generated from the electromagnet 51 flows. In the present embodiment, when the armature 40 is coupled to the pulley 30 in the axial direction, the rotational drive force of the engine 10 is transmitted to the armature 40.

Figure 4:
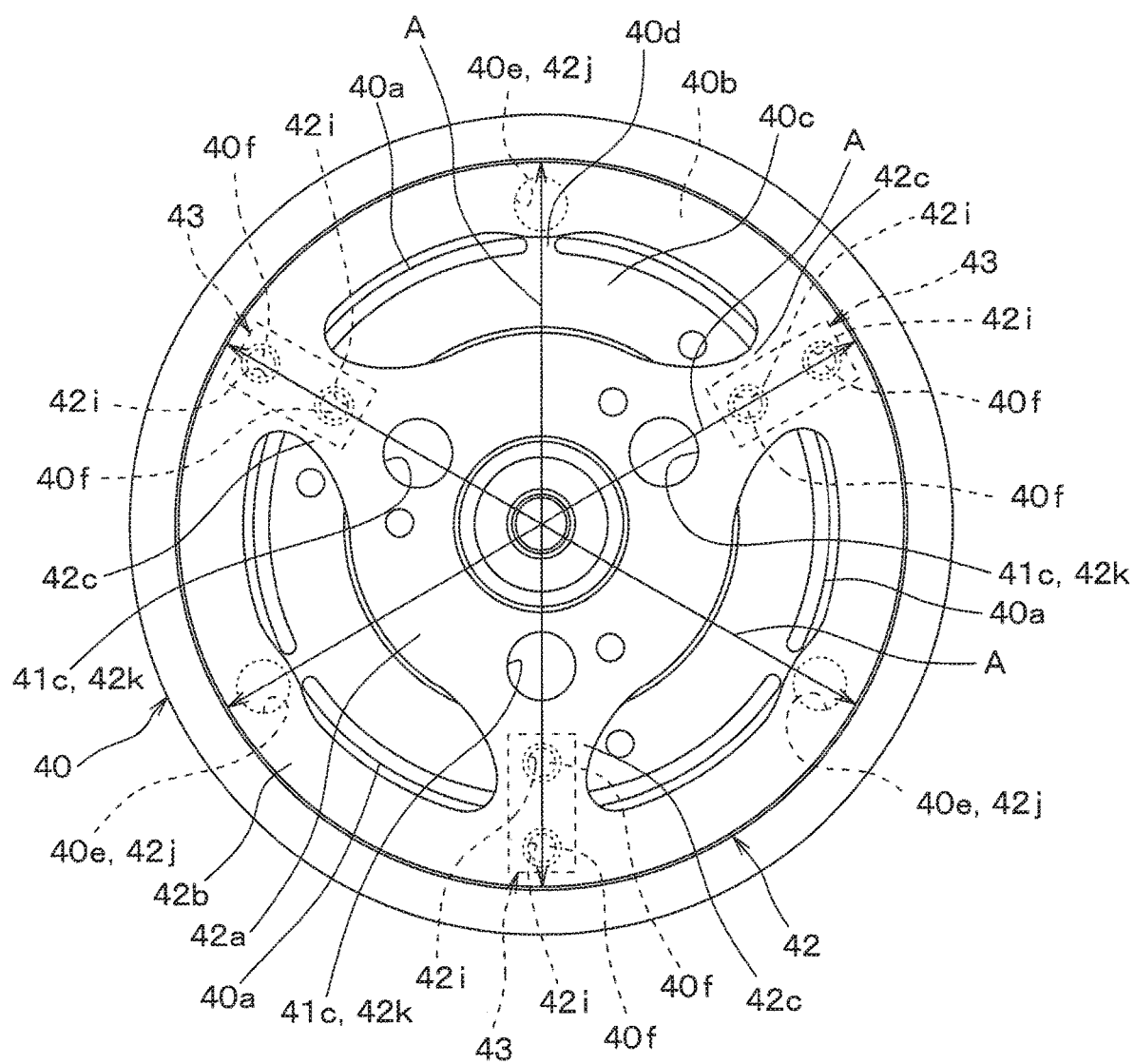
FIG. 4 is a front view of the electromagnetic clutch mechanism of FIG. 1.

As shown in FIG. 4, in the present embodiment, the armature 40 includes a plurality of slit holes 40a, which penetrate through a front side to a back side of the armature 40, and the slit holes 40a are respectively shaped into an arcuate form that has a center of the arc placed at the axis of the rotatable shaft 2a. In the view taken in the axial direction, the slit holes 40a are placed in a single row in the radial direction and are arranged one after another in the circumferential direction. As shown in FIG. 3, a radial position of the slit holes 40a is between the slit holes 33a, which are placed at the radially inner side of the end surface portion 33, and the slit holes 33b, which are placed at the radially outer side of the end surface portion 33. In the present embodiment, the armature 40, which is shaped into the ring plate form, includes a plurality of bridges 40d, each of which is located between corresponding adjacent two of the slit holes 40a of the armature 40. Each bridge 40d connects between an outer ring plate portion 40b of the armature 40, which is located on a radially outer side of the slit holes 40a, and an inner ring plate portion 40c of the armature 40, which is located on a radially inner side of the slit holes 40a.

Furthermore, as shown in FIGS. 2 to 4, in the present embodiment, a plurality of rivet holes 40e, which are used to join between the armature 40 and the flat spring 42, is formed at the outer ring plate portion 40b of the armature 40. As shown in FIG. 4, in the present embodiment, the number of the rivet holes 40e is three, and these rivet holes 40e are arranged one after another at generally equal intervals in the circumferential direction.

In the present embodiment, a planar surface portion, which is formed at one end of the armature 40 in the axial direction, is opposed to the end surface portion 33 of the pulley 30 and forms a friction surface that contacts the pulley 30 when the pulley 30 and the armature 40 are coupled with each other. The one end of the armature 40 is located at the right side in FIGS. 2 and 3.

Figure 5:
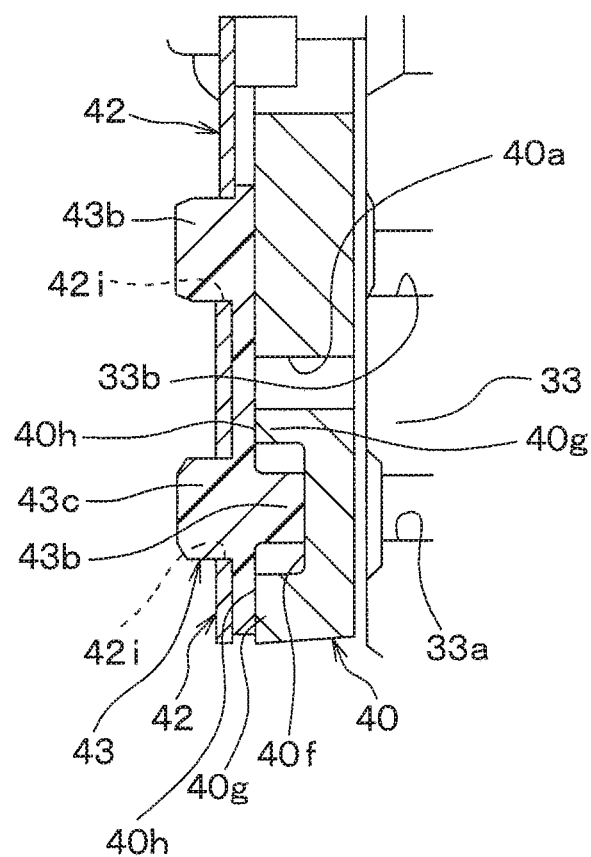
FIG. 5 is a diagram showing a magnified view of an area surrounded by a ring in FIG. 2.

Here, as shown in FIGS. 2, 3 and 5, in the present embodiment, the armature 40 includes a plurality of recesses 40f that are recessed in a direction Da, which is opposite to a direction Db that is directed from the armature 40 toward the elastic member 43. Each of the recesses 40f functions as an urging portion that exerts an urging force to the elastic member 43 through contact of the recess 40f against the elastic member 43 at least at the time of energizing the electromagnet 51. As shown in FIGS. 2 and 3, the recesses 40f are formed at the outer ring plate portion 40b. Because of this arrangement, the flat spring 42 and the armature 40 are less likely to be spaced from each other, and thereby the urging force tends to be maintained. As shown in FIG. 4, the recesses 40f may be additionally formed at the inner ring plate portion 40c. Alternatively, as shown in FIG. 3, the recesses 40f may not be formed at the inner ring plate portion 40c.

Furthermore, as shown in FIG. 4, each of the recesses 40f is formed at a corresponding intermediate region that is located between corresponding adjacent two of the rivet holes 40e in the circumferential direction. When the recess 40f is formed at the corresponding intermediate region between the corresponding adjacent two of the rivet holes 40e, the amount of displacement of the flat spring 42 can be increased. Thereby, a reaction force can be easily transmitted.

Furthermore, as shown in FIGS. 3 and 4, a maximum profile size of each of the recesses 40f is smaller than a shortest distance from the slit hole 40a to an outer peripheral edge of the armature 40. When the size of the recess 40f is increased, a size of a magnetic path is reduced to result in a reduction in the attractive force. Therefore, when the size of the recess 40f is minimized in the above-described manner, the noisy sound limiting effect can be enhanced while a reduction in the attractive force is limited.

Furthermore, with reference to FIGS. 2 to 5, in the present embodiment, the armature 40 includes a plurality of surrounding portions 40g. Each of the surrounding portions 40g is formed continuously with the corresponding recess 40f such that the surrounding portion 40g surrounds all around an axis of a projection 43b of the elastic member 43. With reference to FIG. 5, each surrounding portion 40g of the armature 40 includes a surface 40h that is connected to the flat spring 42 through the elastic member 43. In the present embodiment, a clutch performance of the electromagnetic clutch mechanism 20 is enhanced by coupling the surface 40h of the surrounding portion 40g to the flat spring 42 and by minimizing the size of each recess 40f through the provision of the surrounding portion 40g.

The inner hub 41 is a hub member. In the present embodiment, the coupling between the armature 40 and the rotatable shaft 2a of the compressor 2 is made through the inner hub 41 and the flat spring 42.

The inner hub 41 includes: a cylindrical tubular portion 41a, which extends in the axial direction of the rotational axis; and a flange portion 41b, which is in a form of a flange and radially outwardly projects from one end part of the cylindrical tubular portion 41a located on the one side in the axial direction of the rotational axis. In FIGS. 2 and 3, this one end part in the axial direction of the rotational axis is the left end part. The cylindrical tubular portion 41a is coaxial with the rotatable shaft 2a of the compressor 2. The flange portion 41b is placed on a radially inner side of the armature 40 that is shaped into the ring plate form. The inner hub 41 is securely fixed to the rotatable shaft 2a through a bolt hole (not shown), which is formed at the rotatable shaft 2a of the compressor 2, and a bolt 44. In the present embodiment, the inner hub 41 and the rotatable shaft 2a of the compressor 2 may be fixed together by using a fastening means, such as splines and key grooves. The splines are serrations.

Furthermore, as shown in FIGS. 2 to 4, in the present embodiment, the inner hub 41 includes a plurality of rivet holes 41c that are used to join between the inner hub 41 and the flat spring 42.

The flat spring 42 is a spring in a plate form and generates a resilient force, which urges the armature 40 in the direction indicated by the reference sign Db shown in FIGS. 2 and 3. The direction indicated by the reference sign Db is the opposite direction, which is opposite from the direction Da, in which the electromagnet 51 attracts the armature 40 in the axial direction of the rotational axis. Furthermore, as shown in FIGS. 2 to 5, the flat spring 42 includes: a plurality of rivet holes 42j, which are used to join between the flat spring 42 and the armature 40; a plurality of rivet holes 42k, which are used to join between the flat spring 42 and the inner hub 41; and a plurality of rivet holes 42i, which are used to join between the flat spring 42 and the elastic members 43. As shown in FIG. 4, the rivet holes 42j, which are used to join between the flat spring 42 and the armature 40, are respectively placed at generally center parts of a plurality of arm portions 42c and boundary parts, each of which is located between the outer peripheral portion 42b and a corresponding one of the arm portions 42c. The rivet holes 42k, which are used to join between the flat spring 42 and the inner hub 41, are respectively placed at boundary parts, each of which is located between the inner peripheral portion 42a and a corresponding one of the arm portions 42c.

At the time of assembling the flat spring 42 to the armature 40, as shown in FIGS. 2 and 3, the rivets 45 are inserted into the rivet holes 42j of the flat spring 42 and the rivet holes 40e of the armature 40, and distal end parts of these rivets 45 are upset. Thereby, the flat spring 42 is joined to the armature 40. Similarly, at the time of assembling the flat spring 42 to the inner hub 41, the rivets 46 are inserted into the rivet holes 42k of the flat spring 42 and the rivet holes 41c of the inner hub 41, and distal end parts of these rivets 46 are upset. Thereby, the flat spring 42 is joined to the inner hub 51. As discussed above, the armature 40 and the flat spring 42 are joined together basically by the rivets 45. In the present embodiment, the projections 43b of the elastic members 43 are respectively surrounded by the surrounding portions 40g of the armature 40, as discussed above. Therefore, even when the coupling between the armature 40 and the flat spring 42 through the rivets 45 is released, the positional relationship between the armature 40 and the flat spring 42 is likely maintained.

The flat spring 42 is placed such that the flat spring 42 covers the flange portion 41b of the inner hub 41 and the armature 40 from the one axial end side, and the flat spring 42 is joined to both of the armature 40 and the inner hub 41. In FIGS. 2 and 3, the one axial end side is the left side.

As shown in FIG. 4, the flat spring 42 has a circular plate form as a whole and is formed integrally as one piece from a resilient metal material. More specifically, the flat spring 42 includes: the inner peripheral portion 42a, which is overlapped with the flange portion 41b of the inner hub 41; the outer peripheral portion 42b, which is overlapped with the armature 40; and the plurality of arm portions 42c, which join between the inner peripheral portion 42a and the outer peripheral portion 42b in the radial direction. Here, as shown in FIG. 4, the number of the arm portions 42c of the flat spring 42 is three. The arm portions 42c are arranged one after another at equal angular intervals and radially extend from the inner peripheral portion 42a to the outer peripheral portion 42b. At least a part of each arm portion 42c of the flat spring 42 and at least a part of the outer peripheral portion 42b of the flat spring 42 are overlapped with the corresponding elastic member 43. With the above described configuration, initial deflection is provided to the flat spring 42.

Each of the elastic members 43 is a member made of elastomer having a function of alleviating a collision impact generated at the time of colliding the armature 40 against the pulley 30. As shown in FIG. 4, in a plan view, each of the elastic members 43 is shaped into a generally quadrangular form and is formed in one piece from a material such as EPDM. Here, it should be noted that EPDM is ethylene propylene diene methylene-linkage rubber. As shown in FIGS. 2, 3 and 5, the elastic member 43 includes a base 43a, a projection 43b and a projection 43c. As shown in FIG. 4, the three elastic members 43 are arranged one after another at the generally equal intervals in the circumferential direction. In the present embodiment, the number of the elastic members 43 and the locations of the elastic members 43 are not necessarily limited to any particular ones. However, from the view point of alleviating the vibrations of the armature 40, it is desirable that the elastic members 43 are arranged one after another at the generally equal intervals in the circumferential direction.

As shown in FIGS. 2 to 5, the base 43a is a basic portion shaped into the plate form, and a part of the base 43a is held between the flat spring 42 and the armature 40. That is, in the electromagnetic clutch mechanism 20 of the present embodiment, at the location where the base 43a of the elastic member 43 is placed between the flat spring 42 and the armature 40, the pulley 30, the armature 40, the elastic member 43 and the flat spring 42 are arranged in this order in the axial direction of the rotational axis. The part of the base 43a of the elastic member 43, which is placed between the flat spring 42 and the armature 40, receives the urging force from the armature 40 at least at the time of energizing the electromagnet 51 and implements the function of alleviating the collision impact generated between the pulley 30 and the armature 40 by exerting the elastic force thereof.

As shown in FIGS. 2, 3 and 5, the projection 43b is formed at the surface of the base 43a of the elastic member 43, which faces the side where the armature 40 is placed. The projection 43b projects in a recessing direction of the recess 40f at the armature 40, i.e., projects in the direction Da, which is opposite to the direction Db that is directed from the armature 40 toward the elastic member 43. The projection 43b contacts the recess 40f while the projection 43b is compressed against the recess 40f of the armature 40. The projection 43b is an urging-force receiving portion that receives the urging force from the recess 40f at least at the time of energizing the electromagnet 51. The projection 43b implements the function of alleviating the collision impact generated between the pulley 30 and the armature 40 by exerting the elastic force thereof. In the present embodiment, the projection 43b is a portion that contacts the recess 40f of the armature 40, so that it is possible to limit an increase in the size of the electromagnetic clutch mechanism 20, which would be otherwise caused by the thickness of the projection 43b measured in the axial direction of the rotational axis, by the amount that corresponds to the depth of the recess 40f. Therefore, in the present embodiment, it is possible to increase the thickness of the elastic member 43 in the axial direction of the rotational axis to sufficiently alleviate the vibrations of the armature 40 while limiting the increase in the size of the electromagnetic clutch mechanism 20.

From the view point of alleviating the vibrations of the armature 40, according to the present embodiment, it is preferred that each recess 40f of the armature 40 and the corresponding projection 43b of the elastic member 43, which receives the urging force from the recess 40f, are radially placed as much outward as possible. Specifically, in the case where each recess 40f of the armature 40 and the corresponding projection 43b of the elastic member 43, which receives the urging force from the recess 40f, are radially outwardly placed, the flat spring 42 becomes difficult to be separated from the armature 40 at the time of occurrence of the vibrations of, for example, the armature 40. Therefore, in this case, the reliably compressed state of the projection 43b of the elastic member 43 by the recess 40f of the armature 40 can be easily maintained, and thereby the alleviation of the vibrations of the armature 40 is enhanced.

Furthermore, as shown in FIG. 5, the projection 43c, which projects in the direction Db that is directed from the armature 40 toward the resilient member 43, is formed at the surface of the base 43a of the elastic member 43, which faces the side where the armature 40 is placed. The projection 43c is inserted into the corresponding rivet hole 42i of the flat spring 42.

At the time of assembling the elastic members 43 to the flat spring 42, as shown in FIG. 5, the projection 43c of each elastic member 43 is inserted into the corresponding rivet hole 42i of the flat spring 42 such that a distal end part of the projection 43c of the elastic member 43 is pinched by the corresponding rivet hole 42i. Thereby, each elastic member 43 is joined to the flat spring 42.

The stator 50 includes the electromagnet 51 that is configured to generate the attractive magnetic force, which couples between the pulley 30 and the armature 40.

Next, the operation of the electromagnetic clutch mechanism 20 of the present embodiment will be described. At the time of coupling between the pulley 30 and the armature 40, the electric power is supplied from the air conditioning control device 6 of the vehicle air conditioning apparatus to the electromagnet 51. Thereby, the magnetic flux, which is generated by the electromagnet 51, flows in two magnetic circuits.

Here, one of these two magnetic circuits is a magnetic circuit, in which the magnetic flux generated from the electromagnet 51 flows through the end surface portion 33, the armature 40 and the outer cylindrical tubular portion 31 in this order. The other one of the two magnetic circuits is a magnetic circuit, in which the magnetic flux generated from the electromagnet 51 flows through the end surface portion 33, the armature 40 and the inner cylindrical tubular portion 32 in this order.

In these magnetic circuits, the attractive magnetic force, which is stronger than the elastic force, i.e., the reaction force of the elastic members 43, is generated. Therefore, the armature 40 is attracted toward the pulley 30, i.e., is attracted in the direction indicated by the reference sign Da in FIG. 3. Thus, the armature 40 is coupled to the pulley 30, as shown in FIG. 3. As a result, the rotational drive force is transmitted from the engine 10 to the compressor 2.

At this time, the projections 43b of the elastic members 43 respectively contact the recesses 40f of the armature 40 such that the collision impact generated between the pulley 30 and the armature 40 is alleviated by the elastic force of the projections 43b of the elastic members 43. Furthermore, the collision impact, which is generated between the pulley 30 and the armature 40, is also alleviated by the elastic force of the part of the base 43a of the elastic member 43, which is placed between the flat spring 42 and the armature 40, although the amount of alleviation of the collision impact by the part of the base 43a is not as large as the projection 43b. As discussed above, according to the present embodiment, the operational sound, which is generated at the time of coupling between the pulley 30 and the armature 40, can be reduced.

At the time of decoupling between the pulley 30 and the armature 40, the air conditioning control device 6 of the vehicle air conditioning apparatus stops the supply of the electric power to the electromagnet 51. Thereby, the attractive magnetic force of the magnetic circuits is lost, so that as shown in FIG. 2, the armature 40 is urged and is displaced by the resilient force of the flat spring 42 in the direction away from the pulley 30, i.e., the direction, which is indicated by the reference sign Db in FIG. 3. Specifically, a gap of a predetermined size is formed between the armature 40 and the pulley 30, and thereby the armature 40 is decoupled from the pulley 30. As a result, the rotational drive force is not transmitted from the engine 10 to the compressor 2.

As discussed above, in the electromagnetic clutch mechanism 20 of the present embodiment, the armature 40 includes the recesses 40f, each of which is recessed in the direction Da opposite to the direction Db that is directed from the armature 40 toward the elastic member 43. Each of the recesses 40f functions as the urging portion that exerts the urging force to the elastic member 43 through the contact of the recess 40f against the elastic member 43 at least at the time of energizing the electromagnet 51. Each elastic member 43, which has the function of alleviating the collision impact generated at the time of colliding the armature 40 against the pulley 30, includes the projection 43b that functions as the urging-force receiving portion that receives the urging force from the recess 40f at least at the time of energizing the electromagnet 51.

Therefore, in the electromagnetic clutch mechanism 20 of the present embodiment, the collision impact generated between the pulley 30 and the armature 40 can be alleviated by the elastic force of the projection 43b of each elastic member 43 at the time of energizing the electromagnet 51. Furthermore, since the projection 43b is the portion that contacts the corresponding recess 40f of the armature 40, it is possible to limit the increase in the size of the electromagnetic clutch mechanism 20, which would be otherwise caused by the thickness of the projection 43b measured in the axial direction of the rotational axis, by the amount that corresponds to the depth of the recess 40f. Therefore, in the present embodiment, the thickness of the elastic member 43 measured in the axial direction of the rotational axis can be increased while limiting the increase in the size of the electromagnetic clutch mechanism 20, and thereby the vibrations of the armature 40 can be sufficiently alleviated.

Furthermore, in the electromagnetic clutch mechanism 20 of the present embodiment, the armature 40 includes the surrounding portions 40g, each of which is formed continuously with the corresponding recess 40f such that the surrounding portion 40g surrounds all around the axis of the projection 43b of the elastic member 43, which serves as the urging-force receiving portion. Furthermore, each of the surrounding portions 40g includes the surface 40h that is coupled to the flat spring 42 through the corresponding elastic member 43.

Therefore, in the electromagnetic clutch mechanism 20 of the present embodiment, the surface 40h of each surrounding portion 40g is coupled to the flat spring 42, and the size of each recess 40f is minimized by the provision of the surrounding portion 40g. Thus, the clutch performance of the electromagnetic clutch mechanism 20 is enhanced. Furthermore, the surrounding portions 40g of the armature 40 respectively surround the projections 43b of the elastic members 43, so that the position of the armature 40 is less likely deviated even when the armature 40 is vibrated.

Furthermore, in the electromagnetic clutch mechanism 20 of the present embodiment, at least a part of the base 43a of the elastic member 43 is placed between the flat spring 42 and the armature 40. In addition to this, when the electromagnet 51 is energized, at least the part of the base 43a of the elastic member 43 receives the urging force from the armature 40 to alleviate the collision impact generated at the time of colliding the armature 40 against the pulley 30.

Therefore, according to the electromagnetic clutch mechanism 20 of the present embodiment, particularly the vibrations of the armature 40 can be alleviated.

Other Embodiments

The present disclosure should not be limited to the above embodiment, and the above embodiment may be modified in an appropriate manner.

Figure 6:
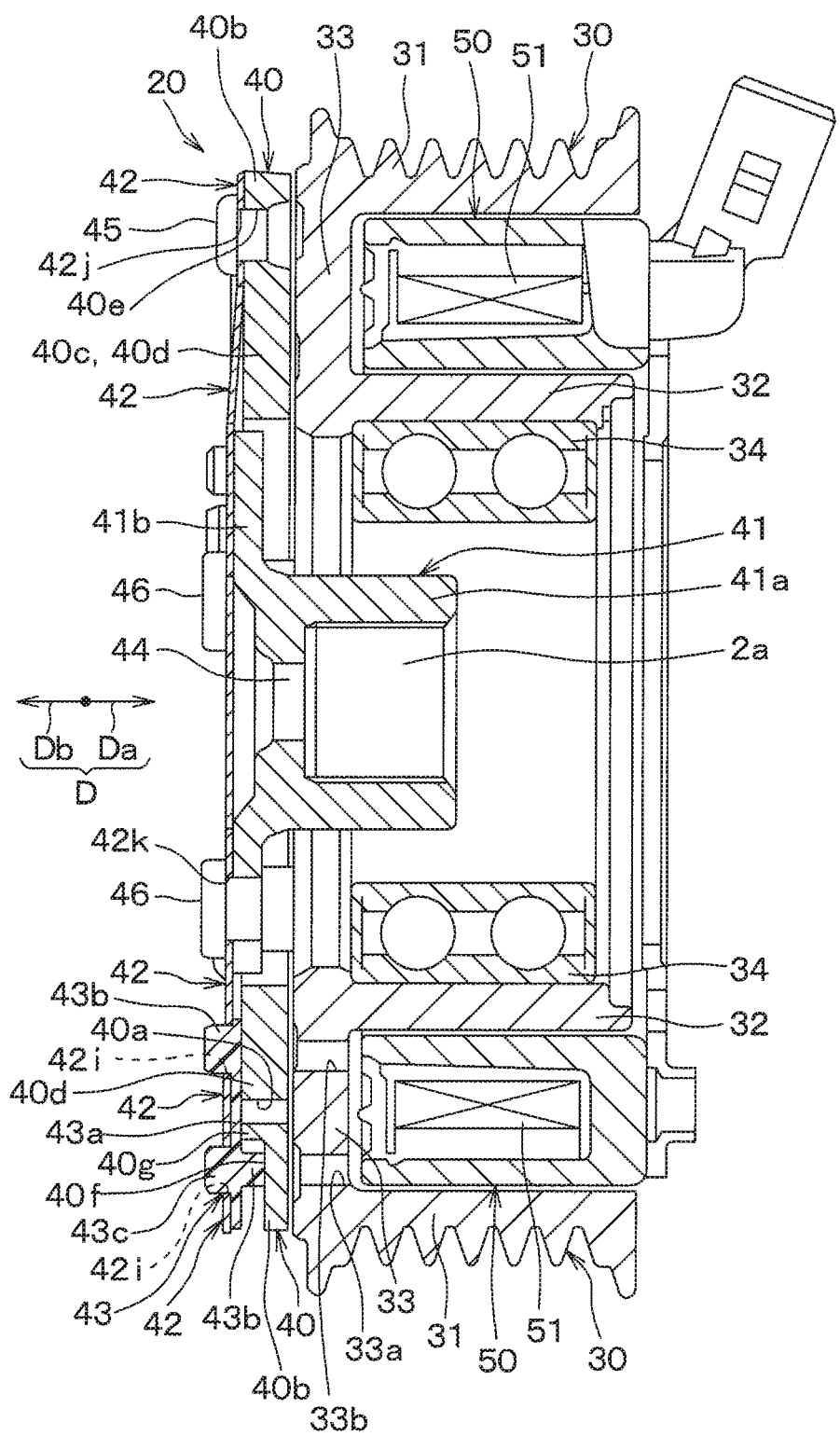
FIG. 6 is a diagram showing an electromagnetic clutch mechanism of another embodiment.

For example, in the first embodiment, the armature 40 includes the surrounding portions 40g, each of which is formed continuously with the corresponding recess 40f such that the surrounding portion 40g surrounds all around the axis of the projection 43b of the corresponding elastic member 43. Here, in the first embodiment, there may be implemented the structure, in which the surrounding portions 40g are not provided. Specifically, as shown in FIG. 6, only a part of an entire circumferential extent of the projection 43b of the elastic member 43 may be covered by the armature 40, and another part of the entire circumferential extent of the projection 43b of the elastic member 43 may not be covered by the armature 40. That is, in the case of the example shown in FIG. 6, although an upper side of the axis of the projection 43b of the elastic member 43 is covered by the armature 40, a lower side of the axis of the projection 43b of the elastic member 43 is not covered by the armature 40. In this case, a surface area of a connecting surface between the armature 40 and the flat spring 42 is reduced in comparison to the first embodiment. Therefore, the clutch performance of the electromagnetic clutch mechanism 20 may be deteriorated. However, similar to the first embodiment, the vibrations of the armature 40 can be sufficiently alleviated while limiting the increase in the size of the electromagnetic clutch mechanism 20.

Summary

According to a first aspect indicated by a portion or a whole of each embodiment discussed above, the electromagnetic clutch mechanism includes the elastic members, each of which alleviates the collision impact generated at the time of colliding the driven-side rotatable body against the driving-side rotatable body. Furthermore, the driven-side rotatable body includes the recesses, and each of the recesses is recessed in the A direction and functions as the urging portion that exerts the urging force to the elastic member through contact of the recess against the elastic member at the time of energizing the electromagnet. The A direction is the direction, which is opposite to the direction that is directed from the driven-side rotatable body toward the elastic member in the axial direction of the rotational axis of the driving-side rotatable body. The elastic member includes the urging-force receiving portion, and the urging-force receiving portion receives the urging force from the recess through contact of the urging-force receiving portion to the recess at the time of energizing the electromagnet.

According to a second aspect indicated by a portion or the whole of each embodiment discussed above, the driven-side rotatable body includes the surrounding portions, each of which is formed continuously with the corresponding recess such that the surrounding portion surrounds all around the axis of the corresponding urging-force receiving portion.

Thus, the clutch performance of the electromagnetic clutch mechanism is enhanced by coupling the surface of the surrounding portion to the flat spring and by minimizing the size of the recess through the provision of the surrounding portion.

According to a third aspect indicated by a portion or the whole of each embodiment discussed above, each elastic member includes: the base, which is shaped into the plate form; and the projection, which projects in the A direction and is formed at the surface of the base that faces the side where the driven-side rotatable body is placed. The projection is the urging-force receiving portion. Furthermore, at least the part of the base is placed between the flat spring and the driven-side rotatable body while at least the part of the base receives the urging force from the driven-side rotatable body at the time of energizing the electromagnet and alleviates the collision impact generated at the time of colliding the driven-side rotatable body against the driving-side rotatable body.

Thereby, particularly, the vibrations of the armature can be alleviated.

The invention claimed is:

1. An electromagnetic clutch mechanism comprising:
a driving-side rotatable body that is rotated by a rotational drive force received from a drive source;
a driven-side rotatable body that receives the rotational drive force when the driven-side rotatable body is coupled to the driving-side rotatable body in an axial direction of a rotational axis of the driving-side rotatable body;
an electromagnet that generates a magnetic force, which attracts the driven-side rotatable body in the axial direction of the rotational axis, at a time of energizing the electromagnet;
a flat spring that generates a resilient force, which urges the driven-side rotatable body in a direction that is axially opposite from a direction of attracting the driven-side rotatable body by the electromagnet in the axial direction of the rotational axis; and
an elastic member that alleviates a collision impact, which is generated at a time of colliding the driven-side rotatable body against the driving-side rotatable body, wherein:
the direction of attracting the driven-side rotatable body by the electromagnet is defined as a first direction, and the direction, in which the resilient force of the flat spring urges the driven-side rotatable body, is defined as a second direction;
the second direction is directed from the driven-side rotatable body toward the elastic member in the axial direction of the rotational axis;
the driven-side rotatable body includes a recess, wherein the recess is recessed in the first direction and functions as an urging portion that exerts an urging force to the elastic member in the second direction through contact of a bottom of the recess against the elastic member at the time of energizing the electromagnet;
the elastic member includes an urging-force receiving portion that projects in the first direction, wherein the urging-force receiving portion receives the urging force from the bottom of the recess in the second direction through contact of the urging-force receiving portion to the bottom of the recess at the time of energizing the electromagnet;
the driven-side rotatable body is an armature; and
the recess is formed at a surface of the armature located on a side where the flat spring is placed.

2. The electromagnetic clutch mechanism according to claim 1, wherein the driven-side rotatable body includes a surrounding portion that is formed continuously with the recess such that the surrounding portion surrounds all around the urging-force receiving portion.

3. The electromagnetic clutch mechanism according to claim 1, wherein:
the elastic member includes:
a base, which is shaped into a plate form; and
a projection, which projects in the first direction and is formed at a surface of the base that faces a side where the driven-side rotatable body is placed;
the projection is the urging-force receiving portion; and
at least a part of the base is placed between the flat spring and the driven-side rotatable body while at least the part of the base receives the urging force from the driven-side rotatable body at the time of energizing the electromagnet and alleviates the collision impact generated at the time of colliding the driven-side rotatable body against the driving-side rotatable body.

4. The electromagnetic clutch mechanism according to claim 1, wherein:
the driven-side rotatable body includes:
an outer ring plate portion that is placed on a radially outer side of a slit hole, which penetrates through a front side and a back side of the driven-side rotatable body; and
an inner ring plate portion that is placed on a radially inner side of the slit hole; and
the recess is formed at the outer ring plate portion.

5. The electromagnetic clutch mechanism according to claim 1, wherein:
the driven-side rotatable body includes:
an outer ring plate portion that is placed on a radially outer side of a slit hole, which penetrates through a front side to a back side of the driven-side rotatable body; and
an inner ring plate portion that is placed on a radially inner side of the slit hole;
a plurality of rivet holes are formed at the driven-side rotatable body to join between the flat spring and the driven-side rotatable body; and
the recess is formed at an intermediate region between two of the plurality of rivet holes.

6. The electromagnetic clutch mechanism according to claim 1, wherein a maximum profile size of the recess is smaller than a shortest distance from a slit hole, which penetrates through a front side to a back side of the driven-side rotatable body, to an outer peripheral edge of the driven-side rotatable body.

* * * * *